US012597018B2

(12) United States Patent
Ferenczi

(10) Patent No.: US 12,597,018 B2
(45) Date of Patent: Apr. 7, 2026

(54) DECENTRALIZED IDENTITY-BASED COMMUNICATION SERVICE

(71) Applicant: American Express Travel Related Services Company, Inc., New York, NY (US)

(72) Inventor: Andras L. Ferenczi, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 147 days.

(21) Appl. No.: 18/220,418

(22) Filed: Jul. 11, 2023

(65) Prior Publication Data

US 2025/0021967 A1 Jan. 16, 2025

(51) Int. Cl.
*G06Q 20/36* (2012.01)
*G06Q 20/22* (2012.01)
*G06Q 20/38* (2012.01)
*G06Q 20/40* (2012.01)

(52) U.S. Cl.
CPC ....... *G06Q 20/3674* (2013.01); *G06Q 20/382* (2013.01); *G06Q 20/401* (2013.01); *G06Q 20/223* (2013.01)

(58) Field of Classification Search
CPC ............. G06Q 20/3674; G06Q 20/382; G06Q 20/401; G06Q 20/223
USPC .......................................................... 705/67
See application file for complete search history.

(56) References Cited

U.S. PATENT DOCUMENTS

| | | | |
|---|---|---|---|
| 2022/0374872 A1* | 11/2022 | Mohanna | G06Q 20/3674 |
| 2023/0073938 A1* | 3/2023 | Robinson-Morgan | H04L 9/50 |
| 2023/0103021 A1* | 3/2023 | Cho | G06Q 20/363 |
| | | | 726/19 |
| 2023/0177487 A1* | 6/2023 | Murdoch | G06F 21/33 |
| | | | 705/44 |

(Continued)

FOREIGN PATENT DOCUMENTS

| | | | | | |
|---|---|---|---|---|---|
| EP | 2747368 A1 * | 6/2014 | | H04W 12/35 |
| KR | 20220061762 A * | 5/2022 | | G06Q 30/0239 |
| WO | 2022/207164 A1 | 10/2022 | | |

OTHER PUBLICATIONS

European Extended Search Report in related EP Application No. 24182290.7, mailed Dec. 11, 2024.

*Primary Examiner* — Courtney P Jones
(74) *Attorney, Agent, or Firm* — Thomas | Horstemeyer, LLP

(57) ABSTRACT

Disclosed are various embodiments for using decentralized identity services and generative large language models (LLMs) to facilitate a humanized interactive chatbot session between two entities where information exchanged can be verified for accuracy. An interactive session can be established between a chat wallet service associated with a first user (e.g., a credential holder) and a second user (e.g., inquirer) using decentralized identity services. Inquiries asked by the second user can be directed to the chat wallet service which can obtain a response from a personalized dialog agent. The personalized dialog agent can obtain the answer by executing a language model that has been trained and personalized using information about the first user. The answer to the inquiry can be verified by comparing the (Continued)

answer with a verified credential associated with the first user. The verified response to the inquiry can then be provided to the second user.

20 Claims, 6 Drawing Sheets

(56)                    References Cited

U.S. PATENT DOCUMENTS

2023/0259922 A1*    8/2023    Rao ........................ H04L 9/3213

* cited by examiner

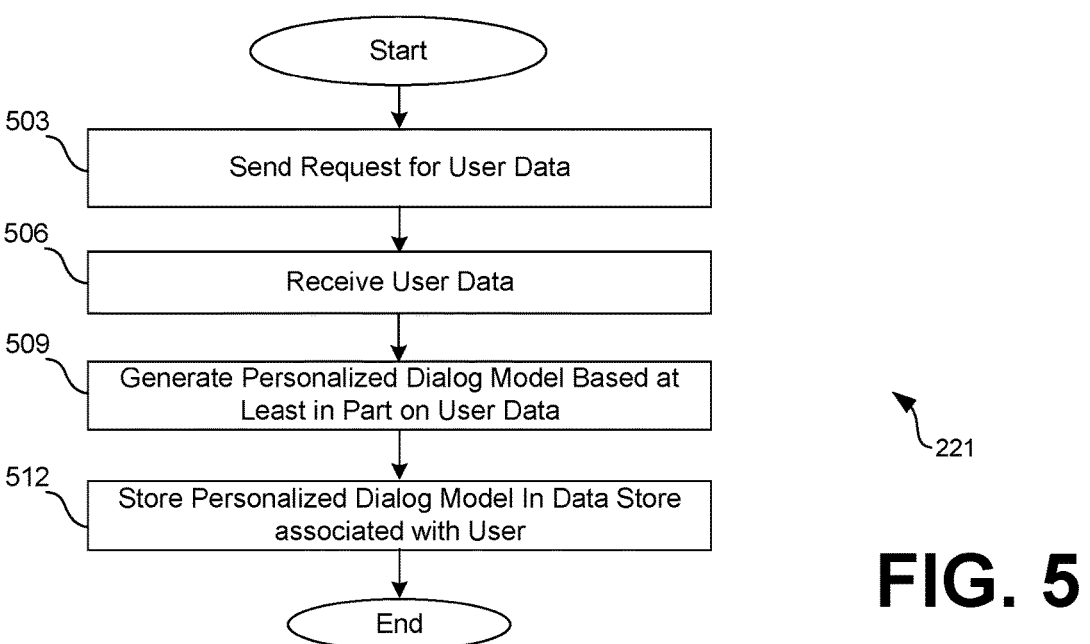

503 — Send Request for User Data

506 — Receive User Data

509 — Generate Personalized Dialog Model Based at Least in Part on User Data

512 — Store Personalized Dialog Model In Data Store associated with User

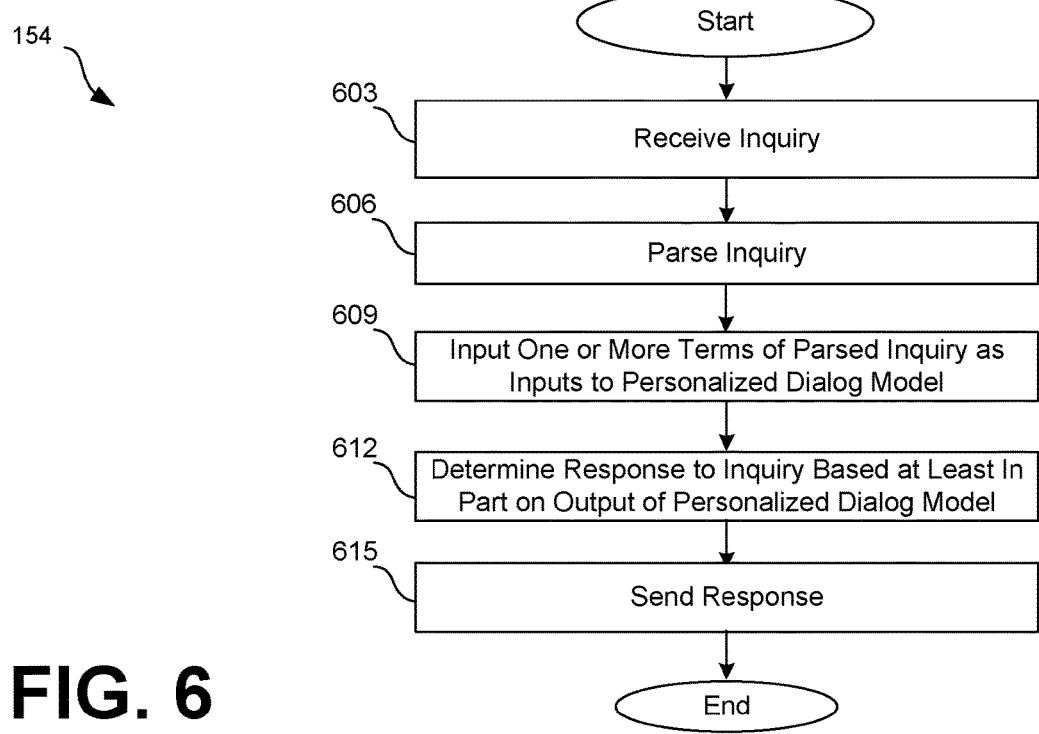

603 — Receive Inquiry

606 — Parse Inquiry

609 — Input One or More Terms of Parsed Inquiry as Inputs to Personalized Dialog Model 612 — Determine Response to Inquiry Based at Least In Part on Output of Personalized Dialog Model 615 — Send Response

FIG. 6

DECENTRALIZED IDENTITY-BASED COMMUNICATION SERVICE

BACKGROUND

During a conversation, a person can ask a question and another person can respond with an answer to the question. Artificial intelligence (AI) services, such as a chatbot, can be used to simulate a conversation between human users. For example, a human can interact with a chatbot via a digital device and be provided responses to questions asked by the human. The responses can be generated and provided by the chatbot. Regardless of whether the responses are AI generated or provided by a human, the inquiring party must trust the responses provided or perform additional verification steps to ensure that the response is accurate.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4-6 are flowcharts illustrating examples of functionality implemented as portions of applications executed in the network environment of FIG. 2 according to various embodiments of the present disclosure.

DETAILED DESCRIPTION

Disclosed are various approaches for using decentralized identity services and generative large language models (LLMs) to facilitate a humanized interactive chatbot session between two entities where information exchanged can be verified for accuracy. In various examples, an interactive chatbot session can be established between a chat wallet service associated with a first user (e.g., a credential holder, responder, etc.) and a second user (e.g., verifier, inquirer, etc.) using decentralized identity services. Inquiries asked by the second user for data associated with the first user can be directed to the chat wallet service which can obtain a response from a personalized dialog agent. In various examples, the personalized dialog agent can obtain the answer by executing a language model that has been trained and personalized using information about the first user. The answer to the inquiry which is output from the trained language model can be verified by comparing the answer with a verified credential associated with the first user. The verified response to the inquiry can then be provided to the second user. In various examples, the interactive session can correspond to a verbal conversation where the chat wallet service can provide the responses in audio and/or video format.

Figure 1:
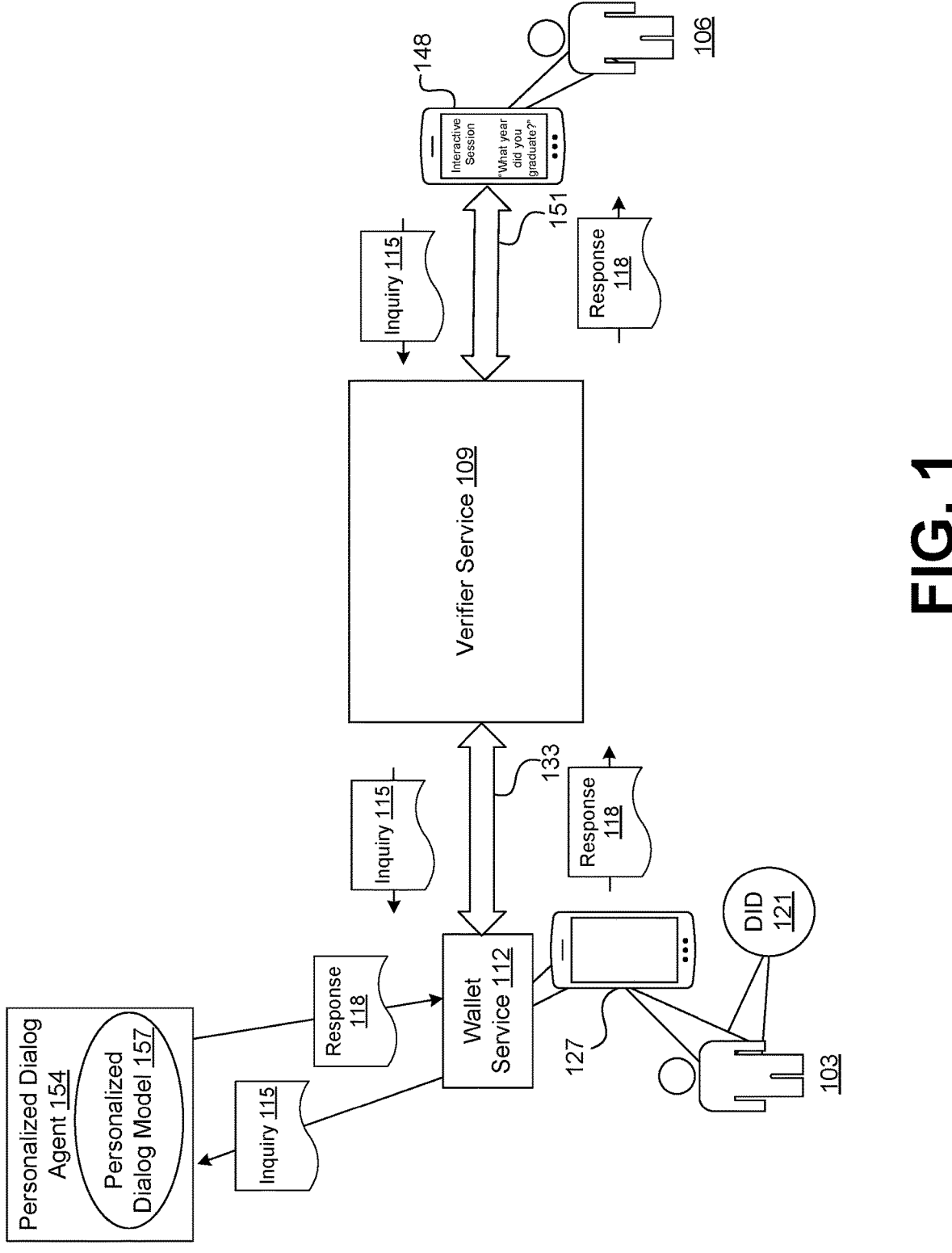
FIG. 1 is a drawing depicting one of several embodiments of the present disclosure.

Turning now to FIG. 1, shown is an example scenario illustrating an interactive session between a first user 103 (e.g., a credential holder, a responder, etc.) and a second user 106 (e.g., a verifier, an inquirer, etc.) according to various embodiments. In various examples, a verifier service 109 can function as an intermediary between the first user 103 and the second user 106. For example, the verifier service 109 can be configured to (1) establish an interactive session between a wallet service 112 associated with the first user 103 and a second user 106 using decentralized identity services and (2) facilitate the exchange of inquiries 115 by the first user 103 and responses 118 associated with the first user 103 during the interactive session and verify the responses 118 associated with the first user 103 prior to providing to the second user 106.

According to various examples, the verifier service 109 can establish an interactive session between a wallet service 112 associated with the first user 103 and the second user 106 using decentralized identity services. For example, the first user 103 can be associated with a decentralized identity (DID) 121. A DID 121 corresponds to an identifier that enables verifiable, decentralized digital identity of a subject (e.g., person, organization, thing, etc.). In this example, the DID 121 can be used to represent the identity of the first user 103. In various examples, a DID 121 can correspond to an address to a DID document 124 (FIG. 2) that includes information associated with the subject (e.g., first user 103). In various examples, the DID 121 can be implemented using various standards, such as a version of the World Wide Web Consortium's (W3C's) Decentralized Identifier (DID) standard.

In various examples, the first user 103 interacting with a first user client device 127 can provide a DID 121 to the verifier service 109 in exchange for a verifier public key 130 (FIG. 2) that can be used by the first user client device 127 and/or wallet service 112 associated with the first user 103 to authenticate the verifier service 109 in future interactions. In various examples, the verifier service 109 can access the corresponding DID document 124 using the DID 121 and obtain a wallet address to interact with a wallet service 112 associated with the first user 103. In some examples, the wallet service 112 can correspond to a cloud-based service. In other examples, the wallet service 112 corresponds to a service that is executable by a first user client device 127.

Figure 2:
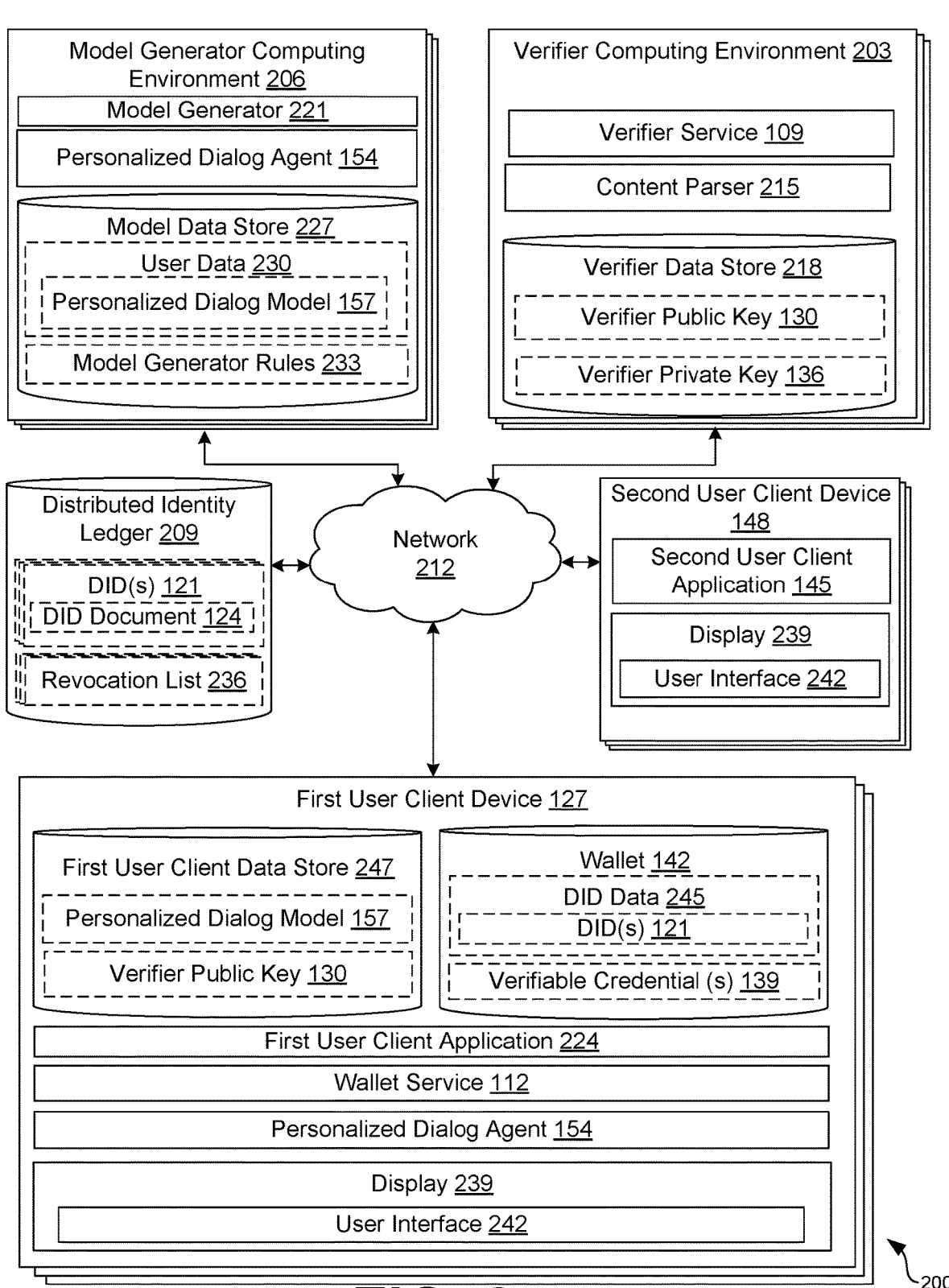
FIG. 2 is a drawing of a network environment according to various embodiments of the present disclosure.

In various examples, the verifier service 109 can establish a first communication channel 133 (e.g., WebSocket, gRPC, etc.) with the wallet service 112 upon determining the wallet address or pathway associated with the wallet service 112. In various examples, the verifier service 109 can be identified by the wallet service 112 based at least in part on the verifier public key 130 that is shared in the initial reaction. For example, the verifier service 109 can sign any cryptographic challenges sent to the verifier service 109 for user verification using a verifier private key 136 (FIG. 2). In this example, the verifier public key 130 can be used to verify the signature of the cryptographic challenge thereby authenticating the verifier service 109.

In various examples, the first user 103 can further correspond to a credential holder having one or more verifiable credentials 139 (FIG. 2) issued by one or more trusted third-party entities. In various examples, a verifiable credential 139 corresponds to a digital credential used to identify an attribute (e.g., qualification, component, authority, achievement, personally quality, etc.) associated with the credential holder (e.g., first user 103). For example, the verifiable credential 139 can be associated with the first user 103 by being linked with and/or otherwise associated with the DID 121 of the first user 103. The verifiable credential 139 can include information represented by a physical credential (e.g., passport, driver's license, birth certificate, etc.) or a non-physical credential (e.g., bank account ownership, etc.) that identifies one or more attributes associated with the first user 103. In various examples, a verifiable credential 139 of the first user 103 can be stored in a wallet 142 (FIG. 2) that is accessible by the wallet service 112. The wallet service 112 can provide a verifiable credential 139 to the verifier service 109 upon establishment of the interactive session. In various examples, the verifier service 109 can extract content from the verifiable credential 139 that can be used to verify responses 118 received from the wallet service 112.

In various examples, the second user 106 can correspond to a verifying entity and/or inquiring entity who wishes to obtain information about the first user 103. For example, the interactive session can correspond to an interview session where the first user 103 is the interviewee and the second user 106 is the interviewer. In this example, the second user 106 via interactions with a second user client application 145 (FIG. 2) executed on a second user client device 148 (FIG. 2) can send a request to the verifier service 109 to engage in an interactive session with the first user 103. In some examples, the request can include the DID 121 associated with the first user 103 to allow the verifier service 109 to identify the wallet address associated with the wallet service 112.

In various examples, the verifier service 109 can establish a second communication channel 151 (e.g., WebSocket, gRPC, etc.) with the second user client application 145 executed on the second user client device 148. As such, an interactive session can be established by the verifier service 109 in response to the verifier service 109 establishing a first two-way communication channel with the wallet service 112 and a second two-way communication channel with the second user client application 145.

In various examples, upon establishing the interactive session comprising the first communication channel 133 and the second communication channel 151, the verifier service 109 can notify the second user 106 that the interactive session is established. In response, the second user 106 can submit an inquiry 115 for information about the first user 103 to the verifier service 109 through the second communication channel 151. In various examples, the inquiry 115 can be submitted via a text format, an audio format, a video format, and/or other type of format.

In response to receiving the inquiry 115, the verifier service 109 can submit the inquiry 115 to the wallet service 112 associated with the first user 103 via the first communication channel 133. In various examples, the wallet service 112 can then provide the inquiry 115 to a personalized dialog agent 154 that executes a trained personalized dialog model 157 to obtain a response 118 to the inquiry 115. According to various examples, the personalized dialog model 157 can include a large language model that is trained using information associated with the first user 103 to output a response 118 based at least in part on the inquiry 115 and/or terms of the inquiry 115.

The response 118 can be provided to the verifier service 109 via the first communication channel 133. In response to receiving the response 118, the verifier service 109 can verify the response 118. For example, the verifier service 109 can compare the response 118 with the extracted content included in the verifiable credential 139. If the content included in the response 118 matches and/or meets or exceeds a similarity threshold value, the information included in the verifiable credential 139, the verifier service 109 can determine that the response 118 is valid and verify the response 118. Otherwise, the response 118 is not verifiable. Upon verifying the response 118, the verifier service

109 can provide the response to the second user 106. In situations where a response cannot be verified, the verifier service 109 can notify the second user 106 that the response 118 could not be verified. In some examples, the response 118 is still provided to the second user 106. In other examples, the response is not provided to the second user 106.

The interactive session involving the exchange of inquiries 115 and responses 118 can continue with additional inquiries 115 and responses 118 until a request is received to end the interactive session. For example, the second user 106 via interactions with a second user client device 148 can notify the verifier service 109 that the interactive session is complete and that there are no further inquiries 115.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 2, shown is a network environment 200 according to various embodiments. The network environment 200 can include a verifier computing environment 203, a model generator computing environment 206, a distributed identity ledger 209, a first user client device 127 and a second user client device 148, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLU-ETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The verifier computing environment 203 and the model generator computing environment 206 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 203 and the model generator computing environment 206 can employ a plurality of computing devices that can be arranged in one or more server banks or computer banks or other arrangements. Such computing devices can be located in a single installation or can be distributed among many different geographical locations. For example, the verifier computing environment 203 and the model generator computing environment 206 can include a plurality of computing devices that together can include a hosted computing resource, a grid computing resource, or any other distributed computing arrangement. In some cases, the verifier computing environment 203 and the model generator computing environment 206 can correspond to an elastic computing resource where the allotted capacity of processing, network, storage, or other computing-related resources can vary over time.

Various applications or other functionality can be executed in the verifier computing environment 203. The components executed on the computing environment 203 include a verifier service 109, a content parser 215, and other applications, services, processes, systems, engines, or functionality not discussed in detail herein.

The verifier service 109 can be executed to (1) establish an interactive session between a wallet service 112 associated with the first user 103 and a second user 106 using decentralized identity services and (2) facilitate the exchange of inquiries 115 by the first user 103 and responses 118 associated with the first user 103 during the interactive session and verify the responses 118 associated with the first user 103 prior to providing to the second user 106.

For example, the verifier service 109 can establish an interactive session between a wallet service 112 associated with the first user 103 and the second user 106 based at least in part on a DID 121 of the first user 103. In various examples, the first user 103 interacting with a first user client device 127 can provide a DID 121 to the verifier service 109 in exchange for a verifier public key 130 that can be used by the first user client device 127 and/or wallet service 112 associated with the first user 103 to authenticate the verifier service 109 in future interactions. In various examples, the verifier service 109 can access the corresponding DID document 124 from the distributed identity ledger 209 using the DID 121 and obtain a wallet address or pathway that allows the verifier service 109 to interact with a wallet service 112 associated with the first user 103. In various examples, the verifier service 109 can establish a first communication channel 133 (e.g., WebSocket, gRPC, etc.) with the wallet service 112 upon determining the wallet address associated with the wallet service 112.

In various examples, the second user 106 can correspond to a verifying entity and/or inquiring entity who can wish to obtain information about the first user 103. In various examples, the verifier service 109 can establish a second communication channel 151 (e.g., WebSocket, gRPC, etc.) with a second user client application 145 executed on a second user client device 148 associated with a second user. As such, an interactive session can be established by the verifier service 109 in response to the verifier service 109 establishing a first two-way communication channel with the wallet service 112 and a second two-way communication channel with the second user client application 145.

Upon establishing the interactive session comprising the first communication channel 133 and the second communication channel 151, the verifier service 109 can notify the second user 106 that the interactive session is established. In various examples, the verifier service 109 can facilitate the exchange of inquiries 115 by the first user 103 and responses 118 associated with the first user 103 during the interactive session and verify the responses 118 associated with the first user 103 prior to providing to the second user 106.

For example, the verifier service 109 can receive an inquiry 115 for information about the first user 103 from a second user client device 148 through the second communication channel 151. In various examples, the inquiry 115 can be submitted via a text format, an audio format, a video format, and/or other type of format. In response to receiving the inquiry 115, the verifier service 109 can submit the inquiry 115 to the wallet service 112 associated with the first user 103 via the first communication channel 133.

The verifier service 109 can receive a response 118 to the inquiry 115 from the wallet service 112. In response to receiving the response 118, the verifier service 109 can verify the response 118. For example, the verifier service 109 can compare the response 118 with extracted content included in the verifiable credential 139. If the content included in the response 118 matches the information included in the verifiable credential 139, the verifier service 109 can determine that the response 118 is valid and verify the response 118. Otherwise, the response 118 could not be verifiable. Upon verifying the response 118, the verifier service 109 can provide the response to the second user 106. In situations where a response cannot be verified, the verifier service 109 can notify the second user 106 that the response 118 could not be verified. In some examples, the verifier service 109 provides the response 118 to the second user 106. In other examples, the verifier service 109 does not provide the response 118 to the second user 106.

The content parser 215 can be executed to extract, analyze and/or parse digital content into one or more terms. For example, the content parser 215 can comprise a semantic parser that is configured to convert a natural language phrase or utterance into a machine-understandable representation of its meaning. In various examples, the content being extracted and parsed by the content parser 215 can be included in a verifiable credential 139, an inquiry 115, a response 118, and/or other type of object that can include natural language content. For example, the content parser 215 can parse content included in the verifiable credential 139 and content included in the response 118 and compare the parsed content for similarities when determining whether a response should be considered verified. It should be noted that although the content parser 215 is illustrated in FIG. 1 as being separate from the verifier service 109, in some examples, the functionality of the content parser 215 is incorporated into the functionality of the verifier service 109.

Also, various data is stored in a verifier data store 218 that is accessible to the verifier computing environment 203. The verifier data store 218 can be representative of a plurality of verifier data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the verifier data store 218 is associated with the operation of the various applications or functional entities described below. This data can include a verifier public key 130, a verifier private key 136, and potentially other data.

The verifier public key 130 and the verifier private key 136 can correspond to a public-private key pair controlled by a verifier entity associated with the verifier service 109 and the verifier computing environment 203. The key-pair can be generated using various approaches, such as elliptic curve cryptography (ECC) approaches or using approaches based at least in part on the Rivest-Shamir-Adleman (RSA) algorithm. In various examples, the verifier public key 130 can be transmitted to a first user client application 224 and/or a wallet service 112 in exchange for a DID 121 associated with the first user 103. The verifier private key 136 remains stored in the verifier data store 219 and can be used to sign any cryptographic challenges sent to the verifier service 109 for user verification.

Various applications or other functionality can be executed in the model generator computing environment 206. The components executed on the model generator computing environment 206 can include a model generator 221, a personalized dialog agent 154, and other applications, services, processes, systems, engines, or functionality not discussed in detail herein.

The model generator 221 can be executed to train and personalize a personalized dialog model 157 based at least in part on one or more attributes associated with the first user 103. In various examples, a first user 103 can interact with the model generator 221 via interactions with a first user client application 224 to provide information about the first user 103. For example, information can be obtained from scans of physical credentials (e.g., licenses, passport, transcripts, etc.), responses to one or more questionnaires designed to obtain information about the first user 103, resume(s), first user generated summaries, and/or other type of documents and/or inquires that contain information about the first user 103 that can be used to train a personalized dialog model 137.

According to various examples, the personalized dialog model 157 can include a large language model that is trained using information associated with the first user 103 to output a response 118 based at least in part on the inquiry 115 and/or terms of the inquiry 115. In various examples, the personalized dialog model 157 can be trained to output a response 118 to an inquiry 115 in response to the inquiry 115 and/or one or more parsed terms of the inquiry 115 being applied as responses to the personalized dialog model 157.

The personalized dialog agent 154 can be executed to execute the personalized dialog model 157 to obtain a response 118 to an inquiry 115 based at least in part on the personalized information of the first user 103 used to train the personalized dialog model 157. In some examples, the personalized dialog agent 1154 can correspond to a chatbot or other type of application that can be used to imitate or otherwise mimic a human conversation by analyzing and parsing an inquiry 115 and using the personalized dialog model 157 to determine responses 118 to the inquiry 115 on behalf of the first user 103. It should be noted that although the personalized dialog agent 154 is illustrated in FIG. 1 as being located in the model generator computing environment 206 and/or the first user client device 127, in some examples, the personalized dialog agent 154 can be executed in another cloud-based computing environment such as, for example, Amazon Web Services® (AWS®), Azure®, Google Cloud Platform® (GCP®) and/or other type of cloud platform.

Also, various data is stored in a model data store 227 that is accessible to the model generator computing environment 206. The model data store 227 can be representative of a plurality of model data stores 227, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the model data store 227 is associated with the operation of the various applications or functional entities described below. This data can include user data 230, model generator rules 233, and potentially other data. The model generator rules 233 include rules, models, and/or configuration data for the various algorithms or approaches employed by the model generator 221 in generating the personalized dialog model 157 for a given first user 103.

The user data 230 can include data associated with the first user 103 that can be used to personalize and train the personalized dialog model 157. For example, the user data 230 can include a first user identifier, personal data, a personalized dialog model 157, and/or other information. In various examples, the personal data can include scans and/or images of physical credentials (e.g., licenses, passport, transcripts, etc.), responses to one or more questionnaires designed to obtain information about the first user 103, resume(s), first user generated summaries, and/or other type of documents and/or inquires that contain information about the first user 103.

The personalized dialog model 157 can comprise a large language model (LLM) that is trained and personalized to generate natural language responses 118 in response to natural language inquiries 115. The personalized dialog model 157 can include, for example, a decision tree classifier, a gradient boost classifier, a Gaussian naïve Bayes classifier, a reinforcement learning algorithm, a logistic regression classifier, a random forest classifier, a decision tree classifier, a multi-layer perceptron classifier, a recurrent neural network, a neural network, a label-specific attention network, an ensemble model, and/or any other type of trained model as can be appreciated.

The distributed identity ledger 209 represents synchronized, eventually consistent, data stores spread across multiple nodes in different geographic or network locations. Each node in the distributed identity ledger 209 can contain a replicated copy of the distributed identity ledger 209, including all data stored in the distributed identity ledger 209. Records of transactions involving the distributed identity ledger 209 can be shared or replicated using a peer-to-peer network connecting the individual nodes that form the distributed identity ledger 209. Once a transaction or record is recorded in the distributed identity ledger 209, it can be replicated across the peer-to-peer network until the record is eventually recorded with all nodes. Various consensus methods can be used to ensure that data is written reliably to the distributed identity ledger 209. In some implementations, data, once written to the distributed identity ledger 209, is immutable. Examples of a distributed data store that can be used for the distributed identity ledger 209 can include various types of blockchains, distributed hash tables (DHTs), and similar data structures. Various data can be stored in the distributed identity ledger 209. For example, the distributed identity ledger 209 can include DIDs 121 associated with respective first users 103 and a revocation list 236.

A DID 121 corresponds to an identifier that enables verifiable, decentralized digital identity of a subject (e.g., person, organization, thing, etc.). In this example, the DID 121 can be used to represent the identity of the first user 103. In various examples, a DID 121 can correspond to an address to a DID document 124 that includes information associated with the subject (e.g., first user 103). For example, the DID document 124 can comprise a set of data describing the subject and can include various information (e.g., cryptographic keys) that can used to authenticate the subject. In various examples, the DID document 124 can include an address or pathway for accessing a wallet service 112 associated with the first user 103. The revocation list 236 stored in the distributed identity ledger 209 can be updated to indicate that a corresponding credential or DID 121 has been revoked. In various examples, the DID 121, the DID document 124, and the revocation list 236 can be implemented using various standards, such as the World Wide Web Consortium's (W3C's) Decentralized Identifier (DID) standard.

The first user client device 127 and the second user client device 148 are representative of a plurality of client devices that can be coupled to the network 212. The first user client device 127 and the second user client device 148 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The first user client device 127 and the second user client device 148 can include one or more displays 239, such as liquid crystal displays (LCDs), gas plasma-based flat panel displays, organic light emitting diode (OLED) displays, electrophoretic ink ("E-ink") displays, projectors, or other types of display devices. In some instances, the display 239 can be a component of the first user client device 127 and the second user client device 148 or can be connected to the first user client device 127 and the second user client device 148 through a wired or wireless connection.

The first user client device 127 can be configured to execute various applications such as a first user client application 224, a wallet service 112, a personalized dialog agent 154, and/or other applications. The first user client application 224 can be executed in the first user client device 127 to access network content served up by the model generator computing environment 206, the verifier computing environment 203, or other servers, thereby rendering a user interface 242 on the display 239. To this end, the first user client application 224 can include a browser, a dedicated application, or other executable, and the user interface 242 can include a network page, an application screen, or other user mechanism for obtaining user input. The first user client application 224 can be configured to execute applications beyond the first user client application 224 such as email applications, social networking applications, word processors, spreadsheets, or other applications.

The wallet service 112 can be executed to communicate with the model generator computing environment 206, the verifier computing environment 203 and other systems in response to initiation of an identity verification process and/or a communication session with a second user client device 148. In various examples, the wallet service 112 can be executed to generate DID data 245 comprising decentralized identifiers (DIDS) 121. In various examples, the wallet service 112 can store verifiable credentials 139 associated with the first user 103 and issued by a trusted third party in the wallet 142 of the first user 103.

In various examples, the wallet service 112 can be executed to communicate with the verifier service 109 to obtain inquiries 115 provided by a second user client device 148 and provide responses 118 to the inquiries 115 that are generated by the personalized dialog agent 154 associated with the first user 103. In some examples, the wallet service 112 can receive a request to establish an interactive session with a second user 106 associated with the second user client device 148. In various examples, the wallet service 112 can authenticate the verifier service 109 prior to permitting a first communication channel 133 with the verifier service 109 to be created. For example, the wallet service 112 can generate and send a cryptographic challenge to the verifier service 109. In response, the verifier service 109 can return a response to the cryptographic challenge that is signed by a verifier private key 136. The wallet service 112 can authenticate the verifier service 109 based at least in part on the verifier public key 130 and the signature of the cryptographic challenge received from the verifier service 109.

Upon establishing the first communication channel 133 with the verifier service 109, the wallet service 112 can obtain inquiries 115 from the verifier service 109 that are originated by the second user client device 148 associated with the second user 106. The wallet service 112 can initiate a personalized dialog agent 154 associated with the first user 103. The personalized dialog agent 154 can be executed to execute the personalized dialog model 157 to obtain a response 118 to an inquiry 115 based at least in part on the personalized information of the first user 103 used to train the personalized dialog model 157. In some examples, the personalized dialog agent 1154 can correspond to a chatbot or other type of application that can be used to imitate or otherwise mimic a human conversation by analyzing and parsing an inquiry 115 and using the personalized dialog model 157 to determine responses 118 to the inquiry 115 on behalf of the first user 103. It should be noted that although the personalized dialog agent 154 is illustrated in FIG. 1 as being located in the model generator computing environment 206 and/or the first user client device 127, in some examples, the personalized dialog agent 154 can be executed in another cloud-based computing environment such as, for example, Amazon Web Services® (AWS®), Azure®, Google Cloud Platform® (GCP®) and/or other type of cloud platform.

The wallet service 112 can store and access the DID data 245 and verifiable credentials 139 from a corresponding wallet 142. In various examples, the wallet 142 corresponds to a digital identity wallet for securely storing the DID data 245, verifiable credentials 139, and storing the private keys (not shown) associated with one or more DIDs 121 created for the given user. The wallet 142 can comprise a hard wallet or a soft wallet. Although the wallet 142 is illustrated in FIG. 1 as being part of the first user client device 127, it is understood that the wallet 142 can comprise a separate storage device that can be attached to or otherwise communicatively coupled to the first user client device 127. In various examples, access to the wallet 142 can require a passcode that is provided by a user to the wallet service 112 and/or the first user client application 224 to access the wallet 142. For example, the wallet service 112 and/or the first user client application 224 generates and renders a pop-up box or other type of user interface component requesting the user enter a particular passcode. The passcode can comprise a numeric sequence of numbers (e.g., four to six digits) that is provided by the user. Upon receiving a matching access code, the wallet service 112 and/or the first user client application 224 can access the DID data 245 stored on the wallet 142.

The DID data 245 included in the wallet 142 and generated by the wallet service 112 can include one or more DIDs 121 and corresponding key-pairs. A DID 121 corresponds to an identifier that enables verifiable, decentralized digital identity of a subject (e.g., person, organization, thing, etc.). In this example, the DID 121 can be used to represent the identity of the first user 103. In various examples, a DID 121 can correspond to an address to a DID document 124 (FIG.

2) that includes information associated with the subject (e.g., first user 103) and is stored in the distributed identity ledger 209. A DID 121 can used by an individual to assert his or her identity to others and can be stored in the identity ledger 209 to allow others to verify the individual's identity. Accordingly, in some implementations, the DID 121 can include a public key of a public-private key pair controlled by the individual. A DID 121 can be implemented using a variety of approaches, such as the World Wide Web Consortium's (W3C's) Decentralized Identifier (DID) standard.

In various examples, a verifiable credential 139 corresponds to a digital credential used to identify an attribute (e.g., qualification, component, authority, achievement, personally quality, etc.) associated with the credential holder (e.g., first user 103). For example, the verifiable credential 139 can be associated with the first user 103 by being linked with and/or otherwise associated with the DID 121 of the first user 103. The verifiable credential 139 can include information represented by a physical credential (e.g., passport, driver's license, birth certificate, etc.) or a non-physical credential (e.g., bank account ownership, etc.) that identifies one or more attributes associated with the first user 103.

The first user client data store 247 represents mass storage or memory in which the first user client device 127 can store information. The first user client data store 247 can include the personalized dialog model 157, a verifier public key 130 associated with the verifier computing environment 203, and other data. According to various examples, the personalized dialog model 157 can include a large language model (LLM) that is trained using information associated with the first user 103 to output a response 118 based at least in part on the inquiry 115 and/or terms of the inquiry 115. The verifier public key 130 corresponds to a public-private key pair controlled by a verifier entity associated with the verifier service 109 and the verifier computing environment 203. In various examples, the verifier public key 130 can be transmitted to a first user client application 224 and/or a wallet service 112 in exchange for a DID 121 associated with the first user 103. The verifier public key 130 can be used to authenticate the verifier service 109 when engaging in communications with the verifier service 109.

The second user client device 148 can be configured to execute various applications such as a second user client application 145 or other applications. The second user client application 145 can be executed in the second user client device 148 to access network content served up by the verifier computing environment 203, or other servers, thereby rendering a user interface 242 on the display 239. To this end, the second user client application 145 can include a browser, a dedicated application, or other executable, and the user interface 242 can include a network page, an application screen, or other user mechanism for obtaining user input. The second user client application 145 can be configured to execute applications beyond the second user client application 145 such as email applications, social networking applications, word processors, spreadsheets, or other applications.

Figure 3A:
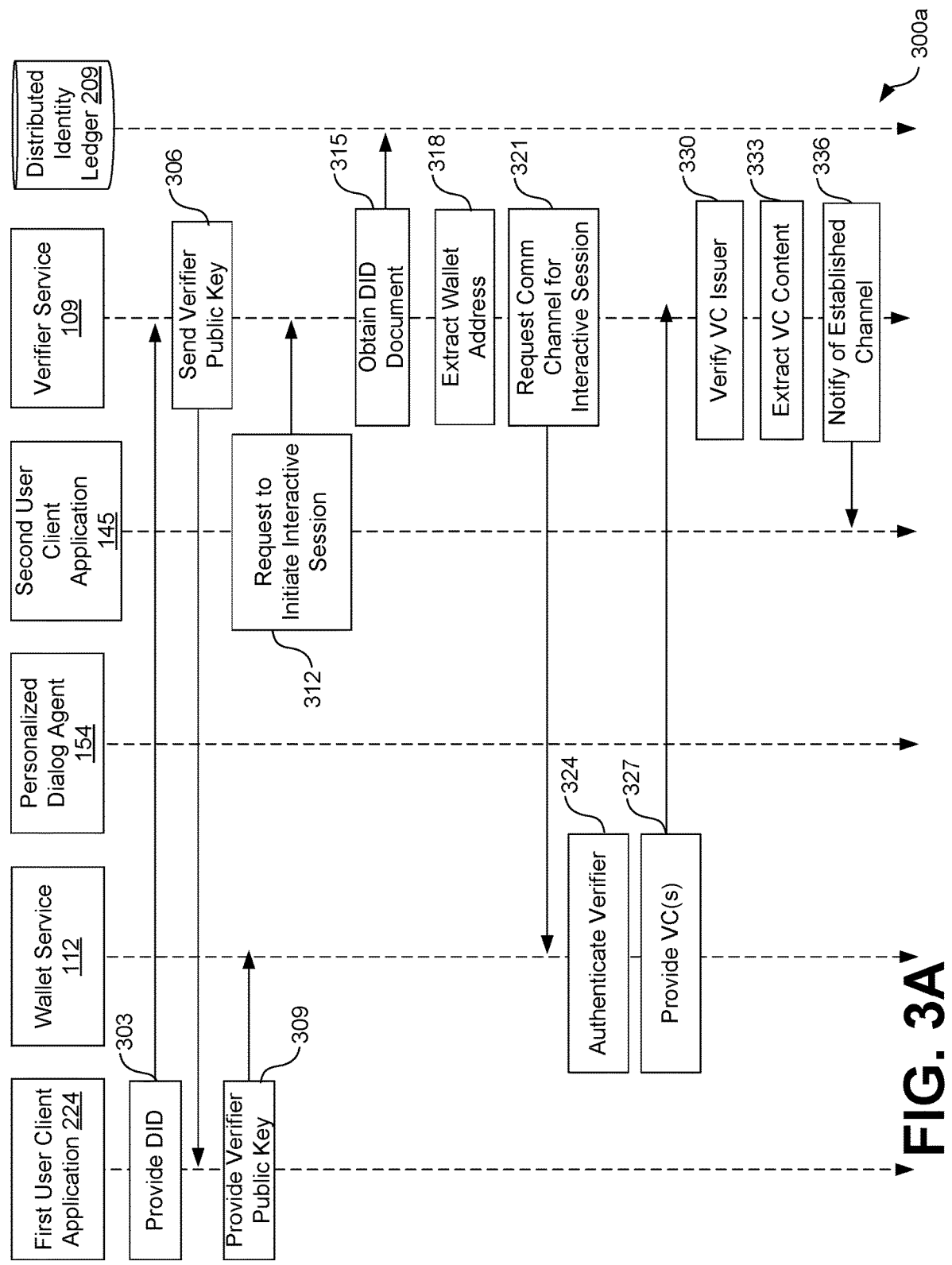
FIGS. 3A-3B are sequence diagrams illustrating examples of functionality in the network environment of FIG. 2 according to various embodiments of the present disclosure.

Next, a general description of the operation of the various components of the network environment 200 is provided with reference to FIGS. 3A-6. To begin, FIGS. 3A and 3B illustrate a sequence diagram 300 (e.g., 300a, 300b) that provides an example of the operation of the components of the network environment 200. It is understood that the sequence diagram 300 of FIGS. 3A and 3B provides merely an example of the many different types of functional arrangements that can be employed to implement the operation of the depicted portion of the network environment 200.

Figure 3B:
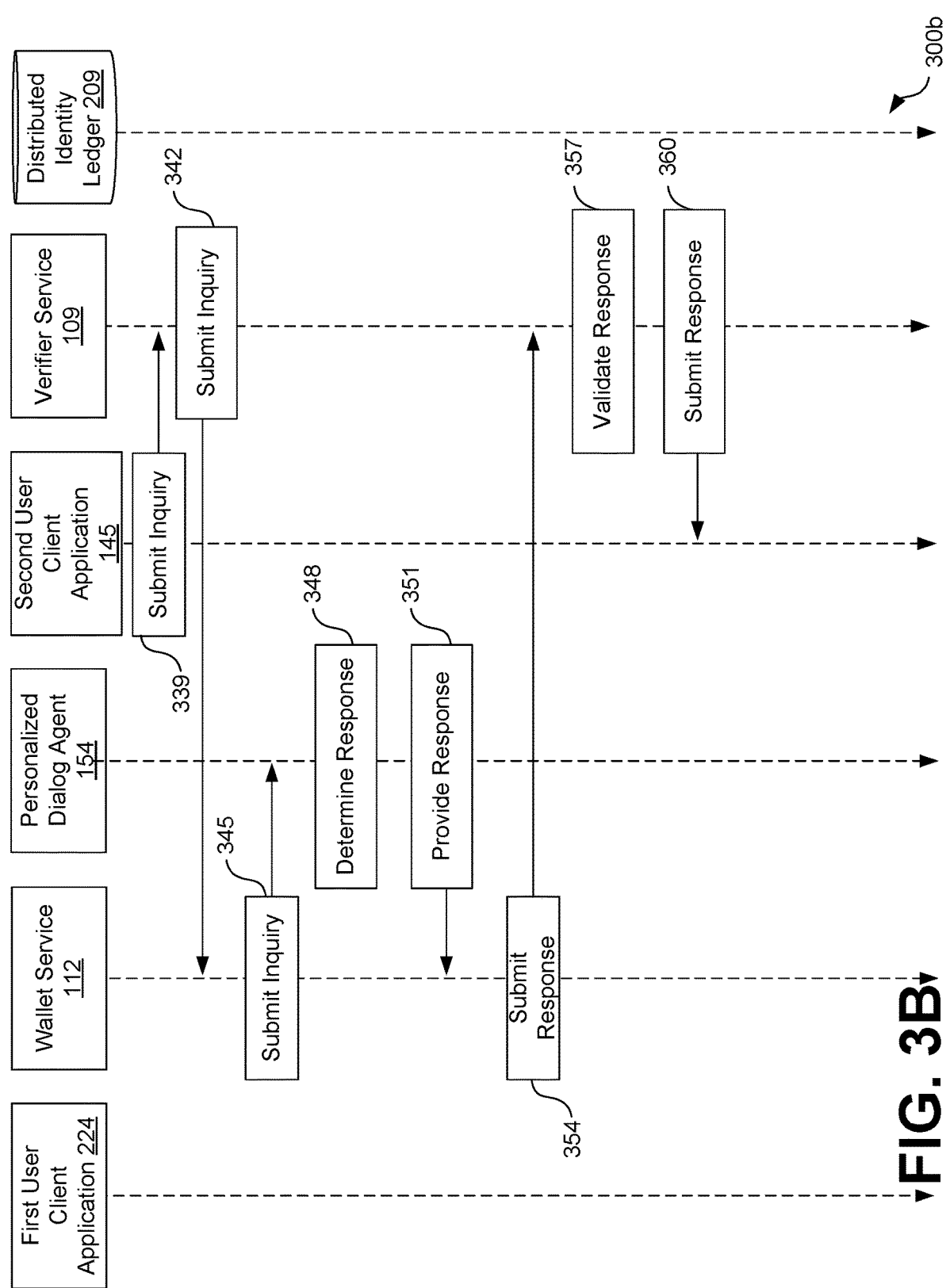

As an alternative, the sequence diagram 300 of FIGS. 3A and 3B can be viewed as depicting an example of elements of a method implemented within the network environment 200. In particular, the sequence diagram 300 of FIGS. 3A and 3B depicts the functionality associated with the establishment and exchange of information during the interactive session associated with a first user 103 and a second user 106.

Beginning with block 303, the first user client application 224 can provide a DID 121 to the verifier service 109. For example, a first user 103 can be associated with a DID 121 that represents the identity of the first user 103 . . . . In various examples, a DID 121 can correspond to an address to a DID document 124 (FIG. 2) that includes information associated with the subject (e.g., first user 103). By providing the verifier service 109 with the DID 121 of the first user 103, the verifier service 109 will be able to access the corresponding DID document 124 to obtain additional information from the first user 103 when establishing an interactive session that is associated with the first user 103 and a second user 106.

In some examples, the first user 103 interacting with the first user client application 224 on the first user client device 127 can interact with a verifier service 109 to establish a relationship and provide the DID 121 to the verifier service 109 for future interactions. For example, assume that the first user 103 is an interviewee preparing for an interview with the second user 106 (e.g., the interviewer) through the interaction session that uses the personalized dialog agent 154 of the user that can provide responses 118 to inquires 115 on behalf of the user. Providing the DID 121 to the verifier service 109 can begin the initialization process for establishing the interactive session that results in the personalized dialog agent 154 to act on behalf of the first user 103 without further involvement of the first user 103.

At block 306, the verifier service 109 can provide a verifier public key 130 to the first user client application 224. The verifier public key 130 can be used by the first user client device 127 and/or wallet service 112 associated with the first user 103 to authenticate the verifier service 109 in future interactions.

At block 309, the first user client application 224 can provide the verifier public key 130 to the wallet service 112 associated with the first user 103. In particular, prior to establishing a communication channel with the verifier service 109 to initiate the interactive session, the wallet service 112 can want to authenticate the verifier service 109 using the verifier public key 130.

At block 312, the second user client application 145 associated with the second user 106 can send a request to the verifier service 109 to initiate an interactive session with the first user 103. For example, the second user 106 can wish to obtain information about the first user 103 and would like to obtain the information through the verification service that establishes the interactive session, facilitates the exchange of inquiries 115 and responses 118, and validates otherwise verifies the responses 118. In various examples, the request can include the DID 121 associated with the first user 103 so that the verifier service 109 can identify the first user 103 and obtain the information needed to initiate the interactive session with the first user 103. In some examples, the request to the verifier service 109 can establish the second communication channel 151 between the verifier service 109 and the second user client application 145 associated with the second user 106.

At block 315, the verifier service 109 can obtain the DID document 124 associated with the DID 121 of the first user 103. In various examples, a DID 121 can correspond to an address to a DID document 124 (FIG. 2) that includes information associated with the subject (e.g., first user 103). For example, the DID document 124 can comprise a set of data describing the subject and can include various information (e.g., cryptographic keys) that can used to authenticate the first user 103. In various examples, the DID document 124 can include an address or pathway for accessing a wallet service 112 associated with the first user 103.

At block 318, the verifier service 109 can extract the wallet address or pathway for accessing the wallet service 112 associated with the first user 103. In some examples, the wallet service 112 can correspond to a chat wallet and the wallet address or pathway to the wallet service 112 can include a uniform resource locator (URL) that provides access to the wallet service 112. In some examples, as illustrated in FIG. 1, the wallet service 112 and corresponding wallet 142 can be hosted by the first user client device 127. In other examples, the wallet service 112 and corresponding wallet 142 can be hosted by a cloud platform. Regardless, the wallet address accessed from the DID 121 can be used by the verifier service 109 to access the wallet service 112 and personalized dialog agent 154 associated with the first user 103.

At block 321, the verifier service 109 can send a request to the wallet service 112 to establish a first communication channel 133. In various examples, the verifier service 109 can establish a first communication channel 133 (e.g., Web-Socket, gRPC, etc.) with the wallet service 112 upon determining the wallet address associated with the wallet service 112.

At block 324, the wallet service 112 can authenticate the verifier service 109 associated with the request to establish the first communication channel 133. For example, the wallet service 112 can generate and send a cryptographic challenge to the verifier service 109. In response, the verifier service 109 can send a response to the cryptographic challenge to the verifier service 109 that is signed using the verifier private key 136. The wallet service 112 can then use the verifier public key 130 that has previously been provided to authenticate the verifier service 109 based at least in part on the signature of the cryptographic challenge.

At block 327, the wallet service 112 can provide one or more verifiable credentials 139 associated with the first user 103 to the verifier service 109. In some examples, the verifiable credentials 139 are provided in response to the request to establish the first communication channel 133 for the interactive session with the second user 106. The wallet service 112 can access the verifiable credentials 139 from the wallet 142 associated with the first user 103 and send the verifiable credentials 139 to the verifier service 109.

At block 330, the verifier service 109 can verify the issuer of the one or more verifiable credentials 139. For examples, a verifiable credential 139 can include a signature that is associated with the issuer of the verifiable credential 139. The verifier service 109 can access a public key associated with the issuer and verify the issuer based at least in part on the issuer public key and the signature of the issuer included in the verifiable credential 139.

At block 333, the verifier service 109 can extract the content included in the one or more verifiable credentials 139. In various examples, the verifier service 109 can extract the content in the verifiable credential 139 via a content parser 215. The content parser 215 can be executed to extract, analyze and/or parse digital content into one or more terms. For example, the content parser 215 can comprise a semantic parser that is configured to convert a natural language phrase or utterance into a machine-understandable representation of its meaning.

At block 336, the verifier service 109 can send a notification to the second user client application 145 indicating that the first communication channel 133 has been established with the wallet service 112 of the first user 103 and that the interactive session can begin. Accordingly, the second user 106 can begin to interact with the wallet service 112 and the corresponding personalized dialog agent 154 that can act and respond on behalf of the first user 103.

At block 339, the second user client application 145 can submit an inquiry 115 to the verifier service 109. The inquiry 115 can correspond to a request for information about the first user 103. For example, in an interview situation, the inquiry 115 can relate to experience, education, and/or other information that is associated with the first user 103. In some examples, the inquiry 115 can correspond to a selection of an inquiry 115 from a plurality of predefined inquiries 115 presented on a user interface 242 displayed on the second user client device 148. In other examples, the inquiry 115 can correspond to text inputted in to a text box component included in the user interface 242. In some examples, the inquiry 115 can be in audio or video format and provided by the second user 106 and can be received via a voice interface and/or other type of user interface. In this example, the second user client device 148 can comprise a camera and/or a microphone and the second user 106 can provide the inquiry 115 which can in turn be provided to the verifier service via the second user client application 145 via the second communication channel 151.

At block 342, the verifier service 109 can provide the inquiry 115 to the wallet service 112 via the first communication channel 133. In this example, the verifier service 109 acts as an intermediary between the second user 106 and the first user 103 as it passes the inquiry 115 received from the second user 106 (e.g., the second user client device 148) to the wallet service 112 associated with the first user 103.

At block 345, the wallet service 112 can provide the inquiry 115 to the personalized dialog agent 154 associated with the first user 103. In various examples, the wallet service 112 can then provide the inquiry 115 to a personalized dialog agent 154 that initiates a personalized dialog model 157 to obtain a response 118 to the inquiry 115. According to various examples, the personalized dialog model 157 can include a large language model that is trained using information associated with the first user 103 to output a response 118 based at least in part on the inquiry 115 and/or terms of the inquiry 115.

At block 348, the personalized dialog agent 154 can be executed to execute a personalized dialog model 157 to obtain a response 118 to the inquiry 115 based at least in part on the personalized information of the first user 103 used to train the personalized dialog model 157. In some examples, the personalized dialog agent 154 can correspond to a chatbot or other type of application that can be used to imitate or otherwise mimic a human conversation by analyzing and parsing an inquiry 115 and using the personalized dialog model 157 to determine responses 118 to the inquiry 115 on behalf of the first user 103. For example, the inquiry 115 can be parsed into one or more terms by the wallet service 112 and/or the personalized dialog agent 154. The one or more inquiry terms can be applied as inputs to the personalized dialog model 157 to determine the corresponding response 118.

At block 351, the personalized dialog agent 154 can provide the response 118 to the wallet service 112 which can then provide, at block 353, the response 118 to the verifier service 109. In some examples, the response 118 can be provided in an audio or video format to humanize the delivery of the response 118 on behalf of the first user 103 to the second user 106.

At block 357, the verifier service 109 can validate the response 118. For example, the verifier service 109 can compare the response 118 with the extracted content included in the verifiable credential 139. In some examples, the verifier service 109 will initiate the content parser 215 to parse the data included in the response 118 prior to comparing the response 118 with the extracted content included in the verifiable credential 139. If the content included in the response 118 matches and/or meets or exceeds a similarity threshold value, the information included in the verifiable credential 139, the verifier service 109 can determine that the response 118 is valid and validate the response 118.

At block 360, the verifier service 109 can provide the response 118 to the second user client application 145. In some examples, the verifier service 109 can generate a user interface including the response 118 in text, audio, and/or video format, and provide the user interface 242 and/or corresponding user interface code to the second user client application 145. Accordingly, the second user client application 145 can render the user interface 242 on the second user client device 148 and provide the response 118 to the second user 106. Thereafter, this portion of the process proceeds to completion.

Figure 4:
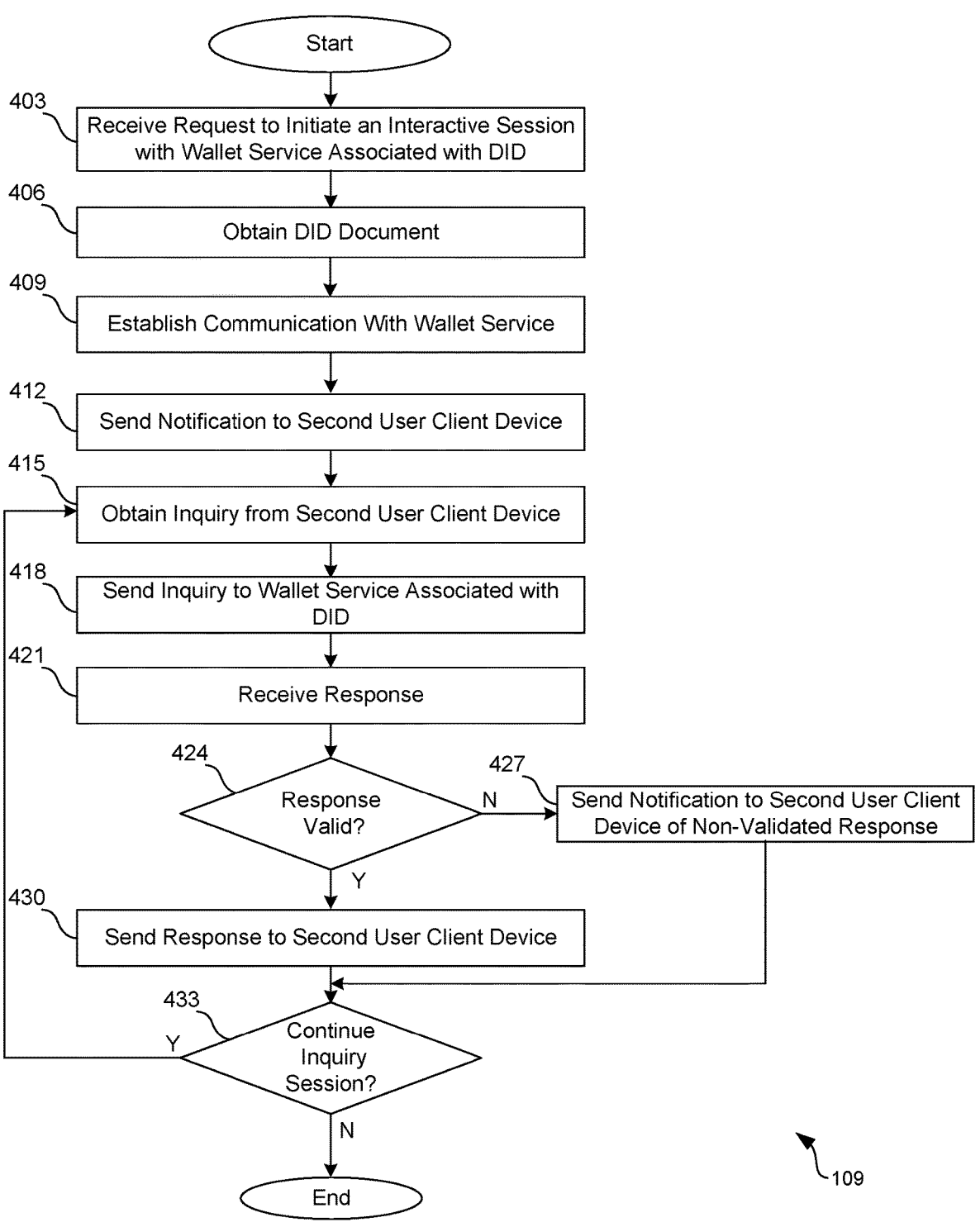

Referring next to FIG. 4, shown is a flowchart that provides one example of the operation of a portion of the verifier service 109. The flowchart of FIG. 4 provides merely an example of the many different types of functional arrangements that can be employed to implement the operation of the depicted portion of the verifier service 109. As an alternative, the flowchart of FIG. 4 can be viewed as depicting an example of elements of a method implemented within the network environment 200.

Beginning with block 403, the verifier service 109 can receive a request to initiate an interactive session with a wallet service 112 associated with a DID 121. For example, the second user client application 145 associated with the second user 106 can send a request to the verifier service 109 to initiate an interactive session with the first user 103. For example, the second user 106 can wish to obtain information about the first user 103 and would like to obtain the information through the verification service that establishes the interactive session, facilitates the exchange of inquiries 115 and responses 118, and validates otherwise verifies the responses 118. In various examples, the request can include the DID 121 associated with the first user 103 so that the verifier service 109 can identify the first user 103 and obtain the information needed to initiate the interactive session with the first user 103. In some examples, the request to the verifier service 109 can establish the second communication channel 151 between the verifier service 109 and the second user client application 145 associated with the second user 106.

At block 406, the verifier service 109 can obtain the DID document 124 associated with the DID 121 of the first user 103. In various examples, a DID 121 can correspond to an address to a DID document 124 that includes information associated with the subject (e.g., first user 103). For example, the DID document 124 can comprise a set of data describing the subject and can include various information (e.g., cryptographic keys) that can used to authenticate the first user 103. In various examples, the DID document 124 can include an address or pathway for accessing a wallet service 112 associated with the first user 103.

At block 409, the verifier service 109 can establish the first communication channel 133 with the wallet service 112. For example, the verifier service 109 can send a request to the wallet service 112 to establish the first communication channel 133. In various examples, the verifier service 109 can establish a first communication channel 133 (e.g., WebSocket, gRPC, etc.) with the wallet service 112 upon determining the wallet address associated with the wallet service 112.

At block 412, the verifier service 109 can generate and send a notification to the second user client device 148 indicating that the interaction session has been established. For example, the verifier service 109 can send a notification to the second user client application 145 indicating that the first communication channel 133 has been established with the wallet service 112 of the first user 103 and that the interactive session can begin. Accordingly, the second user 106 can begin to interact with the wallet service 112 and the corresponding personalized dialog agent 154 that can act and respond on behalf of the first user 103.

At block 415, the verifier service 109 can obtain an inquiry 115 from the second user client device 148. For example, a second user 106 can submit an inquiry 115 directed at the first user 103 via interactions with the second user client application 145. The inquiry 115 can correspond to a request for information about the first user 103. The inquiry 115 can be received via a second communication channel 151 established between the verifier service 109 and the second user client application 145.

At block 418, the verifier service 109 can send the inquiry 115 to the wallet service 112 associated with the DID 121. For example, the verifier service 109 can provide the inquiry 115 to the wallet service 112 via the first communication channel 133. In this example, the verifier service 109 acts as an intermediary between the second user 106 and the first user 103 as it passes the inquiry 115 received from the second user 106 (e.g., the second user client device 148) to the wallet service 112 associated with the first user 103.

At block 421, the verifier service 109 can receive the response 118 to the inquiry 115 from the wallet service 112. According to various examples, the response 118 can be determined using a personalized dialog agent 154 associated with the first user 103. In various examples, the wallet service 112 can then provide the inquiry 115 to a personalized dialog agent 154 that initiates a personalized dialog model 157 to obtain a response 118 to the inquiry 115. According to various examples, the personalized dialog model 157 can include a large language model that is trained using information associated with the first user 103 to output a response 118 based at least in part on the inquiry 115 and/or terms of the inquiry 115. In some examples, the response 118 can be provided in an audio or video format to humanize the delivery of the response 118 on behalf of the first user 103 to the second user 106.

At block 424, the verifier service 109 can determine if the response 118 is valid. For example, the verifier service 109 can compare the response 118 with the extracted content included in the verifiable credential 139. In some examples, the verifier service 109 can initiate the content parser 215 to parse the data included in the response 118 prior to comparing the response 118 with extracted content included in a verifiable credential 139 provided by the wallet service 112 during the initiation of the interaction session. If the content included in the response 118 matches and/or meets or exceeds a similarity threshold value, the information included in the verifiable credential 139, the verifier service 109 can determine that the response 118 is valid and validate the response 118. Otherwise, the verifier service 109 can determine that the response 119 is not valid or that the validity of the response cannot be determined. If the response is not valid, the verifier service proceeds to block 427. Otherwise, the verifier service proceeds to block 430.

At block 427, the verifier service 109 can generate and send a notification to the second user client device 148 indicating that the response 118 could not be validated. In some examples, the notification includes the response 118 to the inquiry. In other examples, the response 118 is not provided to the second user client device 148.

At block 430, the verifier service 109 can send the response 118 to the second user client device 148. In some examples, the verifier service 109 can generate a user interface including the response 118 in text, audio, and/or video format, and provide the user interface 242 and/or corresponding user interface code to the second user client application 145. Accordingly, the second user client application 145 can render the user interface 242 on the second user client device 148 and provide the response 118 to the second user 106. Thereafter, this portion of the process proceeds to completion.

At block 433, the verifier service 109 can determine whether to continue with the interactive session. For example, if the second user 106 has additional inquiries 115 to be answered on behalf of the first user 103 by the personalized dialog agent 147, the verifier service 109 will determine to continue with the interactive session and return to block 415. If the wallet service 112 and/or the second user client application 145 request to terminate the interactive session, the verifier service 109 will determine to end the interactive session. Thereafter, this portion of the process proceeds to completion.

Referring next to FIG. 5, shown is a flowchart that provides one example of the operation of a portion of the model generator 221. The flowchart of FIG. 5 provides merely an example of the many different types of functional arrangements that can be employed to implement the operation of the depicted portion of the model generator 221. As an alternative, the flowchart of FIG. 5 can be viewed as depicting an example of elements of a method implemented within the network environment 200.

Beginning with block 503, the model generator 221 can send a request for user data 230 to a first user client application 224 associated with a first user 103. In some examples, the request can comprise a user interface 242 and can request information that is required to personalize and train a personalized dialog model 157 for the first user 103. In some examples, the request can identify questions, documents, and or other information required from the first user 103.

At block 506, the model generator 221 can receive the user data 230 from the first user client application 224. For example, information can be obtained from scans of physical credentials (e.g., licenses, passport, transcripts, etc.), responses to one or more questionnaires designed to obtain information about the first user 103, resume(s), first user generated summaries, and/or other type of documents and/or inquires that contain information about the first user 103 that can be used to train the personalized dialog model 137.

At block 509, the model generator 221 can generate a personalized dialog model 137 using the information about the first user 103 that is included in the obtained user data 230. In various examples, the personalized dialog model 157 can comprise a large language model (LLM) that is trained and personalized to generate natural language responses 118 in response to natural language inquiries 115. In various examples, the model generator 221 trains the personalized dialog model 137 in accordance with the model generator rules 233 and the user data 230.

At block 512, the model generator 221 can store the personalized dialog model 137 in a data store associated with the first user 103 and accessible by the personalized dialog agent 154. For example, the personalized dialog model 137 can be stored in the model data store 227, the first user client data store 247, a cloud-based computing environment and/or any other type of data store. Thereafter, this portion of the process proceeds to completion.

Referring next to FIG. 6, shown is a flowchart that provides one example of the operation of a portion of the personalized dialog agent 154. The flowchart of FIG. 6 provides merely an example of the many different types of functional arrangements that can be employed to implement the operation of the depicted portion of the personalized dialog agent 154. As an alternative, the flowchart of FIG. 6 can be viewed as depicting an example of elements of a method implemented within the network environment 200.

Beginning with block 603, the personalized dialog agent 154 of a first user 103 can receive an inquiry 115 that originated from a second user 106 during an interactive session established between the second user 106. The inquiry 115 can be received from a wallet service 112 associated with the first user 103. The inquiry 115 can correspond to a request for information about the first user 103. For example, in an interview situation, the inquiry 115 can relate to experience, education, and/or other information that is associated with the first user 103. In some examples, the inquiry 115 can correspond to a selection of an inquiry 115 from a plurality of predefined inquiries 115 presented on a user interface 242 displayed on the second user client device 148.

At block 606, the personalized dialog agent 154 can parse the inquiry 115 received. For example, the personalized dialog agent 154 can include or otherwise initiate a parser that can extract, analyze and/or parse digital content into one or more terms. For example, the parser can be a semantic parser that is configured to convert a natural language phrase or utterance into a machine-understandable representation of its meaning.

At block 609, the personalized dialog agent 154 can apply the parsed inquiry terms as an input to a personalized dialog model 157. In various examples, the personalized dialog model 157 is trained to take the inputs associated with the inquiry 115 to determine a response 118 based at least in part on the information used to train the personalized dialog model 157.

At block 612, the personalized dialog agent 154 can determine the response 118 to the inquiry 115 based at least in part on the output of the personalized dialog model 157. In some examples, the personalized dialog agent 154 can convert the output of the personalized dialog model 157 into a natural language format and in some instances, a video or audio format.

At block 615, the personalized dialog agent 154 can send the response 118 to the wallet service 112 which in turn provides to the verifier service 109 for verification prior to being sent to the second user 106. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203, 206.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
 a computing device comprising a processor and a memory; and
 machine-readable instructions stored in the memory that, when executed by the processor, cause the computing device to at least:
  in response to receiving a cryptographic authentication request from a wallet service associated with a first user, perform a cryptographic authentication operation which generates a cryptographic authentication response;
  send the cryptographic authentication response to the wallet service;
  establish an interactive session between the wallet service associated with the first user and a second user client device in response to the cryptographic authentication response authenticating a verifier service, the wallet service and the second user client device being distinct from the computing device;
  obtain a verifiable credential from the wallet service, the verifiable credential being associated with the first user;
  receive an inquiry from the second user client device of the second user;
  send the inquiry to the wallet service;
  in response to receiving a response to the inquiry from the wallet service, determine if the response is valid based at least in part on the verifiable credential; and
  send the response to the second user client device.

2. The system of claim 1, wherein, when executed, the machine readable instructions further cause the computing device to at least:
 receive a decentralized identifier (DID) from a first user client device;
 obtain a DID document associated with the DID from a distributed ledger;
 extract an address for the wallet service from the DID document; and
 send a request to initiate the interactive session to the address of the wallet service.

3. The system of claim 2, wherein when executed, the machine-readable instructions cause the computing device to at least send a public key associated with an entity of the computing device to the first user client device in response to receiving the DID, the public key being used by the first user client device for authentication.

4. The system of claim 1, wherein the machine-readable instructions further cause the computing device to at least receive a request from the second user client device to initiate the interactive session between the wallet service associated with the first user and the second user client device-associated with second user, the request identifying a decentralized identifier (DID) associated with the first user.

5. The system of claim 1, wherein the machine-readable instructions further cause the computing device to at least:
 extract content from the verifiable credential;
 compare the content from the verifiable credential with one or more terms included in the response; and
 determine that the response is valid based at least in part on a comparison of the content with the one or more terms.

6. The system of claim 1, wherein the machine-readable instructions further cause the computing device to at least:
 determine that the response is unable to be validated;
 generate a notification indicating that the response is unable to be validated; and
 send the notification with the response to the second user client device.

7. The system of claim 1, wherein the wallet service is a cloud-based service.

8. A method, comprising:
 in response to receiving a cryptographic authentication request from a wallet service associated with a first user, performing a cryptographic authentication operation which generates a cryptographic authentication response;
 sending the cryptographic authentication response to the wallet service;
 establishing an interactive session between the wallet service associated with the first user and a second user client device in response to the cryptographic authentication response authenticating a verifier service, wherein the interactive session is established by a computing device distinct from the wallet service and the second user client device;
 facilitating a transfer of an inquiry about information of the first user from the second user client device to the wallet service;
 receiving a response to the inquiry from the wallet service;
 validating the response to the inquiry based at least in part on a verification credential associated with the first user; and
 transmitting the response to the inquiry to the second user client device.

9. The method of claim 8, wherein the response to the inquiry corresponds to an output of a personalized dialog model trained on user data associated with the first user.

10. The method of claim 8, further comprising:
 obtaining a decentralized identifier (DID) document associated with the first user from a distributed ledger; and
 extracting an address associated with the wallet service from the DID document;
 sending a request to establish the interactive session to the wallet service via the address.

11. The method of claim 8, further comprising:
 receiving a request to establish the interactive session with the wallet service from the second user client device; and
 sending a notification that the interactive session is established from the wallet service in response to establishing the interactive session.

12. The method of claim 11, wherein the inquiry is received in response to the notification.

13. The method of claim 8, further comprising:

receiving a DID from a first user client device, the DID being used to access the wallet service.

14. The method of claim 8, further comprising receiving the verification credential from the wallet service in response to establishing the interactive session with the wallet service.

15. A non-transitory, computer-readable medium comprising machine-readable instructions that, when executed by a processor of a computing device, cause the computing device to at least:

in response to receiving a cryptographic authentication request from a wallet service associated with a first user, perform a cryptographic authentication operation which generates a cryptographic authentication response;

send the cryptographic authentication response to the wallet service;

establish an interactive session between the wallet service associated with the first user and a second user client device in response to the cryptographic authentication response authenticating a verifier service, the wallet service and the second user client device being distinct from the computing device;

obtain a verifiable credential from the wallet service, the verifiable credential being associated with the first user;

receive an inquiry from the second user client device;

send the inquiry to the wallet service;

in response to receiving a response to the inquiry from the wallet service, determine if the response is valid based at least in part on the verifiable credential; and send the response to the second user client device.

16. The non-transitory, computer-readable medium of claim 15, wherein, the machine-readable instructions, when executed by a processor, further cause the computing device to at least:

receive a decentralized identifier (DID) from a first user client device;

obtain a DID document associated with the DID from a distributed ledger;

extract an address for the wallet service from the DID document; and send a request to initiate the interactive session to the address of the wallet service.

17. The non-transitory, computer-readable medium of claim 16, wherein, the machine-readable instructions, when executed by a processor, further cause the computing device to at least send a public key associated with an entity of the computing device to the first user client device in response to receiving the DID, the public key being used by the first user client device for authentication.

18. The non-transitory, computer-readable medium of claim 15, wherein, the machine-readable instructions, when executed by a processor, further cause the computing device to at least receive a request from the second user client device to initiate the interactive session between the wallet service associated with the first user and the second user client device, the request identifying a decentralized identifier (DID) associated with the first user.

19. The non-transitory, computer-readable medium of claim 15, wherein, the machine-readable instructions, when executed by a processor, further cause the computing device to at least:

extract content from the verifiable credential;

compare the content from the verifiable credential with one or more terms included in the response; and determine that the response is valid based at least in part on a comparison of the content with the one or more terms.

20. The non-transitory, computer-readable medium of claim 15, wherein, the machine-readable instructions, when executed by a processor, further cause the computing device to at least receive:

determine that the response is unable to be validated;

generate a notification indicating that the response is unable to be validated; and send the notification with the response to the second user client device.

\* \* \* \* \*